Dec. 1, 1931. C. N. COLSTAD 1,834,682
GUIDING ATTACHMENT FOR AUTOMOBILES
Filed Feb. 7, 1931
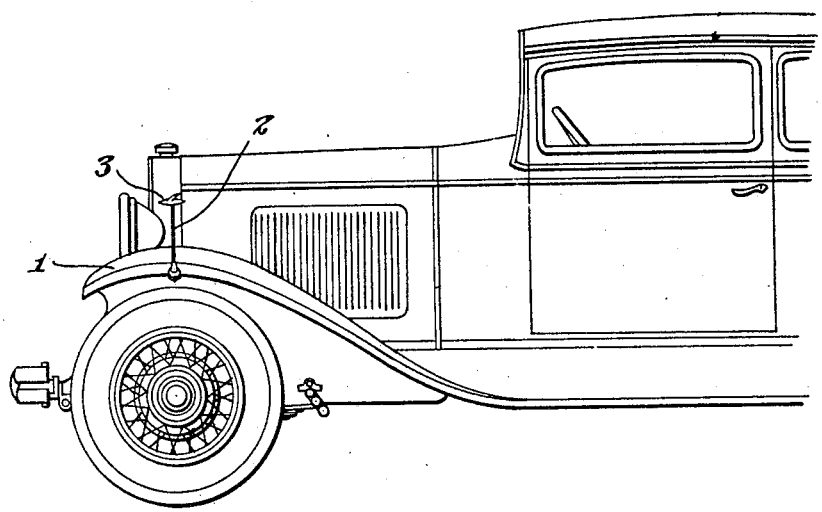
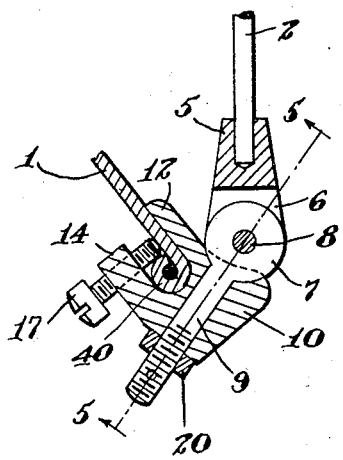
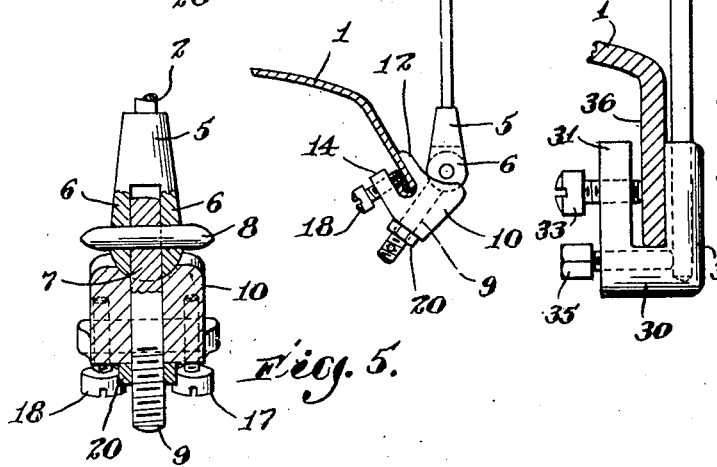
Inventor
Charles N. Colstad
by James R. Hodden
Attorney Patented Dec. 1, 1931

1,834,682

UNITED STATES PATENT OFFICE

CHARLES N. COLSTAD, OF ATTLEBORO, MASSACHUSETTS, ASSIGNOR TO LEWIS R. SMITH, OF ATTLEBORO, MASSACHUSETTS, RECEIVER OF APCO MOSSBERG CORPORATION

GUIDING ATTACHMENT FOR AUTOMOBILES

Application filed February 7, 1931. Serial No. 514,112.

My present invention is a novel and improved device adapted to be attached to the forward mudguards of an automobile, and to be so constructed and arranged as to be adjustable vertically irrespective of the curvatures of the portion of the mudguard to which it is attached, which device would include a staff or rod of sufficient height and, preferably to carry a visual indicator device on the uppermost portion adjusted in alignment with the outer edge of the mudguard to give to the driver visual indication of the positions of each mudguard. This device I have named a "guidon" and it is of great importance to facilitate the driving and parking of automobiles, as it gives to the driver instinctively and unconsciously a visual locating or indicating means to position the portion of the mudguard to which it is applied.

Heretofore, great difficulty has been experience by drivers, particularly when parking cars in crowded thoroughfares, such drivers denting and cramping the mudguard of the auto they are maneuvering because they were unable to calculate, with any degree of nicety, the positions of the mudguard of the car with that of adjacent objects or other cars in close proximity.

In carrying out my present invention it is essential that attaching means be provided which will enable the staff or rod to be vertically positioned irrespective of the curvature or angle of the mudguard, or that portion of it to which the device is to be attached. Furthermore, as most designs of automobiles differ, such a device has to be universally attachable and detachable to a wide range of designs.

At the forwardmost end of usual automobile mudguards a reverse curve is present, curving forwardly, as well as downwardly, and here again I have provided means enabling this device to be suitably affixed to any such curved portion and to still maintain the rod or staff in vertical poistion to give the guiding effect to the driver.

While such staff or rod would accomplish the purpose desired without any ornamentation on the upper part, yet it is also desirable to have a visual direction indicating object which will be in longitudinal alignment with the automobile and, hence, with the mudguard to which the staff is attached to still further aid the driver in appreciating the location and position of the mudguard, particularly when he is unable to see same directly.

In carrying out the invention, I provide a universally adjustable clamping device of simple, efficient, and novel construction, as will be more fully explained, together with an aligning indicating member at the top of the staff also adjustable to conform to the longitudinal alignment desired.

Referring to the drawings illustrating a preferred embodiment of my invention;

Fig. 1 is a fragmentary view of an automobile with my improved "guidon" attached to the left forward mudguard in a convenient position;

Fig. 2 is an enlarged view of the same;

Fig. 3 is a similar view showing the mudguard in cross-section;

Fig. 4 is an enlarged view on the line 4—4 of Fig. 2;

Fig. 5 is a cross-sectional view on the line 5—5 of Fig. 4; and

Fig. 6 is a cross sectional view of a simpler and modified form.

Referring to the drawings, any automobile mudguard 1 is illustrated, which mudguard usually has a downwardly extending curved rim or edge over the wheel and at the uppermost and outermost portion of which my novel "guidon" would ordinarily be attached. It could, of course, be attached to the extreme forward end of the mudguard if desired, as the universal attachment I have provided permits the same irrespective of the contour of the mudguard at any point. My device comprises a staff 2, visual indicating alignment device 3 of any suitable form or contour, such as an arrow, bird, animal or fanciful object, as indicated in the drawings, said object having a recess suitably threaded on the topmost part of the rod or staff 2, thus giving turning adjustment therefor, if desired. The staff 2 has its lower end also fitted into a corresponding recess in the socket member 5, thus providing rotative capacity for adjustment of the upper indicator Figure 3 at each end of the staff 2.

The socket member 5 is formed with a pair of flanges 6, 6 adapted to straddle a clamping member 7, which member is pivoted thereto by a pin 8 through appropriate recesses in the clamp 7 and flanges 6, 6, said member 7 having a shank 9 extending through a bored recess in the mudguard engaging member 10. The member 10 is arranged with the recess of the shank 9 at an angle relatively with the extending mudguard engaging arms 12 and 14, the arm 14 having a pair of threaded recesses therethrough in appropriate position to receive correspondingly threaded clamping bolts 17 and 18, which bolts engage the mudguard portion 11 fitted between the arms 12 and 14, clamping same firmly to the other arm 12.

To tighten the clamps 7 I provide a threaded nut 20 on the shank 9 of the clamp 7, as clearly shown in the drawings. In order to apply and adjust the device, the bolts 17 and 18 are backed off sufficiently to enable the member 10 to be fitted over the edge of the rim of the mudguard 1 in any desired or convenient location, sliding same along the mudguard until the desired position is reached. Thereupon the clamping bolts 17 and 18 are tightened and the device secured to the mudguard. When in this position it is necessary to have the shaft or rod extend vertically and thereupon the nut 20 is released, loosening the clamp 7, and the staff 2 is swung into vertical alignment and the nut 20 tightened, clamping same in position to which the shaft has been adjusted. It is thereupon desirable to also adjust the visual indicating device 3 in longitudinal alignment with the automobile or with the mudguard to which it is attached, whereupon either the staff is rotated slightly in the socket 5, or the indicating device at the uppermost end of the staff 2 is rotated, frictional engagement of the same with the staff 2 and with the socket 5 being sufficient to hold same when so adjusted.

Referring to Fig. 6, wherein I have shown an extremely simple modification, the staff 2 is attached to the auto mudguard 1 by an extremely simple clamp comprising a round or square member 30, formed with the groove or recess between a pair of extending portions 31 and 32, which groove fits about the lower end of the mudguard and held in position by a bolt or bolts 33, threaded through the arm 31 on the inner side of the mudguard. On the outer side, the arm 32 is bored to receive the foot of the staff 2, which latter may be clamped in position by a bolt 35. In this simple form of the invention I may either bend the staff 2 into vertical position or I may bend a small edge portion of the mudguard, as shown at 36, in order to have the staff 2 vertical. Preferably, the staff would be bent in the case of heavy mudguards, particularly such mudguards where a bead 40 is employed, as illustrated in Fig. 4. The simpler form of the invention, as shown in Fig. 6, is, of course, much less expensive and is designed to fill the demand for smaller and cheaper cars.

It will be seen that I have devised a novel, efficient, quickly detachable, and adjustable, as well as an attractive "guidon" device, constituting an ornament to the vehicle to which it is attached.

I claim:

The combination of a motor vehicle having a mudguard with a slotted block adapted to be clamped on the forward edge portion of the mudguard irrespective of the angle of said mudguard at the point so engaged by the block, adjustable means to clamp the block thereto having a substantially broad bearing surface between the block and the mudguard, means on the outer surface of the block to hold a vertically extending rod, and adjustable means on the uppermost portion of the rod to indicate the longitudinal alinement of the automobile.

In testimony whereof, I have signed my name to this specification.

CHARLES N. COLSTAD.